April 2, 1957  I. D. ANDERSON  2,787,299
TENSIONED BAND SAW BLADE
Filed Jan. 24, 1955
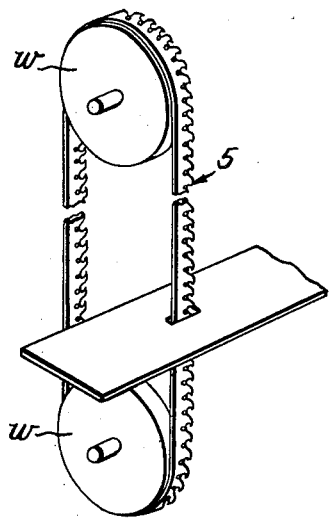
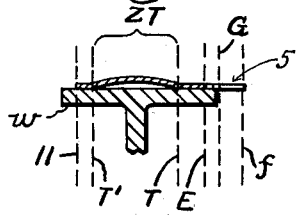
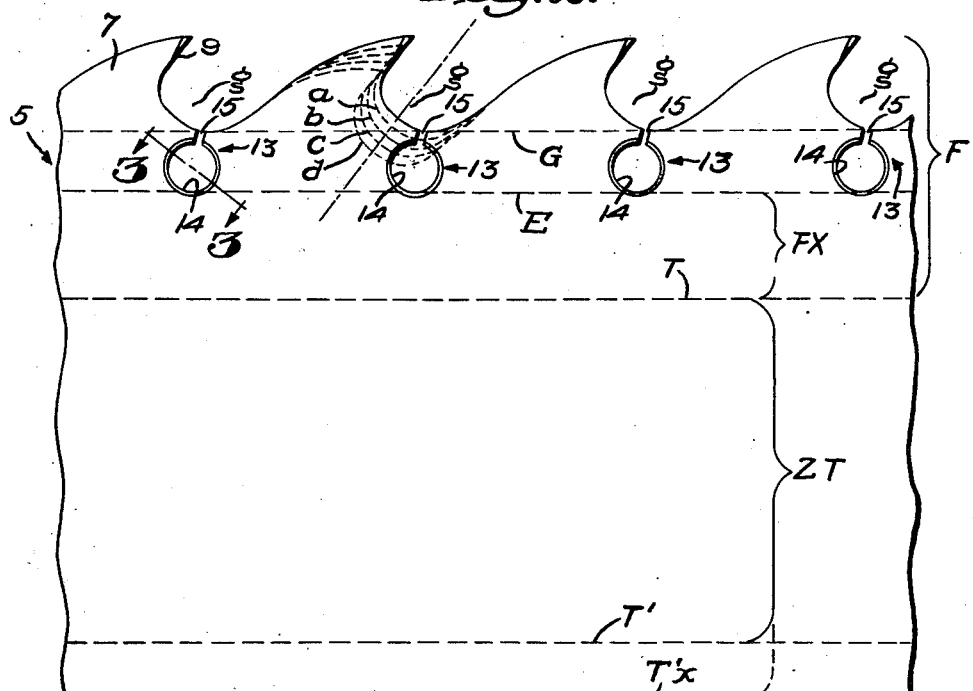
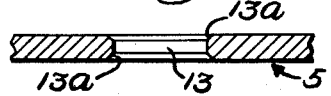
Inventor:
Ike D. Anderson,
by Emery, Booth, Townsend, Miller & Weidner
Attys

United States Patent Office 2,787,299
Patented Apr. 2, 1957

2,787,299

TENSIONED BAND SAW BLADE

Ike D. Anderson, Leominster, Mass., assignor to Simonds Saw & Steel Co., Fitchburg, Mass., a corporation of Massachusetts Application January 24, 1955, Serial No. 483,770

2 Claims. (Cl. 143—138)

This invention relates to band saws, namely endless belts of flexible steel for running about the wheels of a band-saw mill and having teeth along one or both longitudinal edges. It aims to improve band-saw construction and method of manufacture so as better to control the tension, attendantly reducing liability to cracking, particularly in the region of the teeth and gullets, and in general extending the work range and the useful life of band saws.

In the accompanying illustrative drawing:

Fig. 1 is a small-scale perspective and diagrammatic view of a band-saw mill equipped with a band saw of the invention;

Fig. 2 is a side elevation of a short length of the band saw embodying the inventive structure and representing the method of manufacture;

Fig. 3 is a fragmentary section as on the line 3—3 of Fig. 2; and

Fig. 4 is a diagrammatic cross-sectional view of a band saw such as that of Fig. 2, with adjacent wheel portion.

The nature and function of tensioning in band saws in general may be appreciated from the consideration, noting in this connection the diagrammatic Fig. 1, that a band saw is an endless flexible band of steel driven through tight frictional contact with spaced wheels $w$, $w$ about each of which it is continuously being flexed at ever changing sections of its length while it is in operation. And since inherently a band saw has at least one longitudinal edge which is interrupted or discontinuous, namely the front or toothed edge of the band saw, it is clear that resistance to longitudinal stretching is not uniform across the entire width of the band. Necessarily a band saw is more stretchable at the discontinuous or toothed edge. Hence, assuming flat-faced wheels and a flat and non-tensioned band saw, the latter would in operation stretch more at the toothed edge and be relatively looser there and insufficiently stiff at the work to accomplish a straight cut.

Therefore band saws customarily have a tensioning effect built into them whereby in operation they will grip the wheels and be sufficiently tight at both edges despite the inherently greater stretch capacity at the toothed edge. The situation is quite different in band saws as contrasted with circular saws, since in band saws it is not centrifugal force and radial pull which poses the problem but longitudinal stretch and factors due to the necessary flexibility for the metal strip body. Tensioning in band saws as here referred to is imparted by expansion of the metal at central and intermediate longitudinal zones so that resultantly the edge portions are confined and made relatively tight, especially when the mill wheels are subjected to separating pressure loading, as normal in operation. In other words, a central or intermediate zone along the band saw and sometimes entirely to the non-toothed or back edge of the saw, must be made actually longer than one or both edge portions. Such tensioning imparts some degree of crown or convexity to the band-saw blade, the expanded longitudinal zone seeking a larger circumference and hence tending to drop from a straight edge placed across the wheel-engaging face of the band saw. This tension zone along the band saw may be likened in effect to that of the confining metal tire about the felly of a wooden wheel.

Band saws, including log band saws and band resaws, range in widths from 2 in. or less up to 16 in. or wider and in gauge of steel from as thin as 25 gauge to as much as 12 gauge for large heavy log band saws. The principles of the invention apply throughout the band saw range and even to the narrower band or scroll saws of 1½ in. width and under, with relatively less significance for such narrow bands. Because of the band saw variety in width and gauge, including a range of possible gauges for a given width band saw depending on the hardness of the wood and other factors attending the work to be performed (as for example a 7 in. band saw may be of 15 to 19 gauge or thereabouts) no absolute or standard width can be prescribed for the longitudinal zone of tension or "tire" of a band saw. In general however the margin line of the tension zone should be spaced somewhat below (inwardly from) the bottom line of the gullets, sufficiently to avoid undue early cracking there, yet should approach the gullet base line closely enough so that the toothed front edge is not left too stiff or firm.

In other words, a relatively narrow strip of flat un-tensioned metal desirably is left along the bottom of the gullets, between them and the tension line marking the nearest approach of the zone along which tensioning is imparted by rolling. Such strip may be for example ½ in. wide in say an 8 in. saw of 16 gauge with teeth spaced 2 in. between points and gullets ⅞ in. in depth. The zone of tension may extend from such tension line across to the back edge (the non-toothed edge of a single-cutting band saw) or to a line somewhat in from the back edge.

The amount of tension is gauged by the degree of convexity widthwise of the band saw, as for example an 8 in. wide band saw of 16 gauge is ordinarily tensioned to an arc represented by that of a 30-foot circle (diameter). An appropriate amount of "drop" from a straight-edge across the band saw is usually about ¹⁄₁₆ in. in a 10-in. saw, being greatest at the central portion of the saw and decreasing to within about 1½ in. from the toothed front edge and about 1 in. from the back edge. Thus in general the zone along the toothed edge should be relatively stiff or "tight," the back edge somewhat less so, and the intermediate or tensioned zone relatively open or "loose."

The foregoing by way of general definition as to tension in band saws speaks as of the time when a properly conditioned saw is started on a job. The tension line indicated at T in Fig. 2 is definitely located at a certain distance below the bottom line of the gullets $g$. In use the teeth become dulled with more or less rapidity depending on the material being sawed. After some period of operation the band saw requires sharpening, to maintain efficiency. The sharpening operation, by grinding or filing, removes metal from the band at the teeth and gullets. Properly done the tooth grinding is carried down into the band at the bottom of the gullets adjacent the front faces of the teeth to at least as great and preferably somewhat greater extent than rearwardly into the tooth body at the front face. Hence the width of the band saw, properly sharpened, is decreased at each sharpening. With a band saw of good stock this many times repeated sharpening may be continued until an original 12 in. band saw is reduced to 10 in. or even 8 in. width.

From this is will be seen that the location of the tension line such as T of Fig. 2 is in the case of an ordinary band saw not static with reference to the toothed edge. Under repeated sharpenings the toothed edge approaches ever nearer the original tension line T position, both the line of the tooth points and the line of the gullet bodies dropping into closer proximity to the tension line, until cracking at the gullet bottoms begins to develop.

In an effort to avoid such cracking the tensioning of the band, under prior practice, must be changed. The original flat or untensioned zone along the toothed edge must be widened or carried more toward the original center line; in other words, the tension line T of Fig. 2 must be dropped toward the back edge. This difficult operation requires careful attention by skilled saw filers and is time-consuming. At some mills, band saws must be demounted as often as twice or more a day with attendant loss of mill operating time even though spare band saws are kept in readiness for installing.

From the foregoing it is evident that band saws in normal use require considerable attention to prevent cracking in the gullets and to maintain a sharp cutting edge. It is common and necessary saw mill practice to remove a band saw from its mounted position on the mill wheels several times per day to perform the appropriate gullet filing or grinding, with attendant expenditure of time and labor. And under the removal of metal along the tight cutting edge of the band saw, the relative position of the tension line which controls the cutting edge or edges heretofore has shifted, entailing further bench work after a few trips to the filing room.

In accordance with the present invention the tension line of band saws is in effect stabilized, so that the tension line and any physical changes imposed on the saw with reference to the tensioning may remain relatively static over a markedly increased period of operation and use of the band saw, such that the given band saw may be subjected to repeated sharpening operations without having to modify the band-saw tensioning by reason of the decreasing overall band-saw width under the successive sharpenings. This object is accomplished through the novel introduction of a special notching or notch-formation correlated with each gullet of the band saw in the manner best understood by reference to Fig. 2, and noting also Fig. 4.

There a short length of a band saw is indicated as a whole at 5, that selected for purposes of illustration having teeth 7 of any desired size, shape, spacing and hook formed along the front edge of the saw designated by the line f through the outer ends of the sharpened points 9 of the teeth.

The conventional or other gullets g between the back and front faces of adjoining teeth are represented as of the adequately open and well-rounded contour generally preferred for band saws. The back edge of the band saw is indicated at 11, in this example of a single-cutting band saw being non-toothed. It will be understood that the structure and tension control principle of the invention is equally applicable to double-cutting band saws, wherein both longitudinal edges are toothed, such double-cutting band saws being practically equivalent to two single-cutting band saws, one right-hand and the other left-hand, made integral at the back edges.

The tension line such as already discussed is indicated at T. The longitudinal zone of tensioning is designated at the bracketed portion ZT, comprising the main body of the band saw from the tension line T to a lineal position adjacent the back edge 11, at the line T'. As indicated by the dotted lower portion of the bracket and the reference character T'X at or coinciding with the back edge 11 such zone of tensioning ZT may in some instances extend completely to the back edge.

The initial relatively "tight" non-tensioned or flat zone along and including the toothed portion is indicated at F, comprising the strip between the tension line T and the line f at the tooth points. For reference purposes the line along the initial bottommost points of the gullets is indicated at G. The parts, locations and zones of the band saw 5 as mentioned to this point may be of any desired conventional or other form and arrangement.

Referring particularly to Fig. 2, also Fig. 4, in accordance with the invention the customary band-saw structure is improved by the introduction of a novel notching or notch-formation 13 at the bottom of each tooth gullet g whereby without appreciably altering the initial size, shape or contour of the gullet or removing vital metal of the band saw the effective bottom of the gullet as concerns the band-saw tensioning and any imposed physical characteristics attendant on the tensioning is lowered or shifted inward from the initial tooth-line f and toward the tension line T through a distance equivalent to that represented by such eventual deepening of the gullets as would result from a multiplicity of repeated sharpening operations.

In the illustrated example such tension control notching has the overall form of a keyhole indicated generally at 13. Each such notch formation 13 here includes a substantially circular main or inner section 14 and a relatively narrow and relatively short slot or outer section 15 communicating between the lower portion of the corresponding gullet g and the main notch section 14. Each such keyhole section 13, one for each tooth 7 and gullet g, is reamed through to meet from both sides of the band-saw stock and so as to make the entire margin of the notching 13 smooth and stress-free; see in this connection the sectional showing of Fig. 3 wherein the stress-unifying rounding of the notching margin under the reaming or other smooth forming procedure is indicated at 13a, 13a.

The several notchings or slot formations 13 are located and dimensioned so as to remain present at least in effective portion throughout a number of successive sharpening operations and throughout a substantial portion of the operative life of the band saw. Thus their effective action persists over more than one, two or a few sharpenings in the course of any relatively short period during the early stages of the saw life. Further, the keyhole slots 13 are shaped, positioned and arranged to present little or no interference to the usual gullet action in effecting sawdust removal, and also to leave the toothed cutting edge portion of the band saw without objectionable weakening.

The inward encroach of the gullet g through an extended series of successive sharpenings is indicated in Fig. 2 by the series of dotted lines a, b, c, d. These are diagrammatic and of somewhat exaggerated spacing, representing between them removal of more metal than probably would happen in the course of any one sharpening operation. The inner or lowermost line d may be taken as representing the condition after expiry of on toward 50 percent of the operative life of the band saw for work purposes comparable to that for which it was designed in the initial or full-line showing of Fig. 2. Thus in this approximately half-life status of the band saw there is still presented a substantial portion of the original slot formation 13, roughly one-third the area of the main section 14 thereof. It will be noted that under proper sharpening each gullet bottom moves down along a medial line m approximately paralleling the initial hook line of the following tooth 7.

The series of calculated slot formations or notchings 13 serves to stabilize or render static the position of the tension line T relative to what may be termed the effective bottom line or inset slot line E of the gullets g, being the line along the bottommost points of the slottings 13. The initial positioning of the tension line T is calculated with respect to said effective gullet bottom line E, as contrasted with the prior practice of locating it solely with reference to the normal gullet line G and the tooth edge f. Accordingly the relatively untensioned control strip or zone FX between the tension line T and the slot line or effective gullet bottom line E, Figs. 2 and 4, remains the same throughout and for a considerable time beyond the approximate half-life sharpening status for the band saw such as represented by the lowermost dotted lining d in Fig. 2.

Thus when metal is removed from the toothed or discontinuous part of the saw during regular maintenance, the continuous part of the band saw is not disturbed. Furthermore, the smooth and stress-free marginal surface 13a interposed by the tension-control slots or gullet extensions 13 communicating with the gullet bottoms at what is recognized as the point of greatest strain itself materially reduces the disturbance introduced in grinding and thereby further minimizes cracking. At the same time and to the same extent the effective height of the tooth, as concerns the band-saw tensioning, is increased over that normally employed. This in turn narrows the cross-section of the total band saw that has to be flexed about the wheels in the saw operation. Accordingly the operative life of the saw is extended and the saw as a whole is made more durable and is given capacity for use on smaller wheels if desired. It is generally recognized that the tendency to cracking at the gullet or in the tooth region of band saws is inversely proportional to the diameter of the band-saw wheels. Hence under the present invention cracking is minimized for the given band saw and size of wheel, and a given band saw may be run on smaller wheels without cracking.

Further contributing to the improved life and durability for band saws embodying the invention is the consideration, as evident from Fig. 2, that the saw is characterized by a constantly changing tooth pattern, under the contour variations such as at a to d of Fig. 2, modifying both the depth and shape of the gullet and hence reducing tendency to crystallization in the metal and eventual cracking through flexing continuously in one and the same pattern.

As utilized in the manufacture of band saws the method of the invention provides for controlling and stabilizing the tension line by the initial selection of an effective gullet bottom line substantially spaced below the initial standard gullet bottom, slotting the band saw to provide an opening of keyhole-like or other elongate contour, to the normal gullet from such line thereby effectively to lower the gullets and extend the teeth without removal of vital metal, and fashioning such opening to present a smooth and stretch-free surface.

As pointed out, band saws embodying my invention and made under the method thereof have been found to run longer on wheels of given size without cracking, and may be run on smaller wheels without cracking within the usual life period for band saws of like width and gauge but not embodying the invention. In actual practice these band saws hold the tension throughout many sharpening operations while at the same time cracking resultant from effects of grinding and filing in the course of sharpening is minimized.

It will be understood that my invention, either as to method or means, is not limited to the exemplary embodiments or steps herein illustrated or described, and I set forth its scope in my following claims.

I claim:

1. A band saw comprising an endless flexible steel strip body having along an edge an initial tooth and gullet zone presenting cutting teeth with gullets between them, a tensioning zone spaced inwardly from the inner margin of the tooth and gullet zone defined by the initial line of gullet bottoms, and, between the tensioning zone and the initial tooth and gullet zone, an initial pair of zones comprising a relatively non-tensioned control zone next adjacent the tensioning zone and a tension-stabilizing zone of predetermined width between said control zone and the tooth and gullet zone, said tension-stabilizing zone having formed therein at the initial bottom of each gullet a notch formation leading inward from the gullet bottom and of an overall extent transversely of the saw greater than the extent of gullet deepening normally expectable under repeated sharpenings at least to the approximate half-life status for the saw.

2. A band saw according to claim 1 wherein the notch formations are of a general keyhole contour with curvilinear inward portions and relatively short narrow portions communicating to the gullet bottoms.

References Cited in the file of this patent
UNITED STATES PATENTS

| Number | Name | Date |
|---|---|---|
| 66,692 | Emerson | July 16, 1867 |
| 565,298 | Prouty | Aug. 4, 1896 |
| 1,630,468 | Causey | May 31, 1927 |
| 1,723,843 | Chapin | Aug. 6, 1929 |
| 1,790,282 | Philips | Jan. 27, 1931 |